US007674748B2

(12) United States Patent
Ishibashi

(10) Patent No.: US 7,674,748 B2
(45) Date of Patent: Mar. 9, 2010

(54) 4-HYDROXY-4'-ISOPROPOXYDIPHENYL SULFONE DEVELOPER DISPERSION, METHOD OF WET GRINDING, AND THERMAL RECORDING MEDIA

(75) Inventor: Yoshimi Ishibashi, Amagasaki (JP)

(73) Assignee: OJI Paper Co., Ltd., Tokyo (JP)

( * ) Notice: Subject to any disclaimer, the term of this patent is extended or adjusted under 35 U.S.C. 154(b) by 634 days.

(21) Appl. No.: 10/592,687

(22) PCT Filed: Mar. 15, 2005

(86) PCT No.: PCT/JP2005/004535

§ 371 (c)(1),
(2), (4) Date: Sep. 13, 2006

(87) PCT Pub. No.: WO2005/087502

PCT Pub. Date: Sep. 22, 2005

(65) Prior Publication Data

US 2007/0191226 A1 Aug. 16, 2007

(30) Foreign Application Priority Data

Mar. 15, 2004 (JP) ............................ 2004-072352
Jun. 4, 2004 (JP) ............................ 2004-166693
Aug. 31, 2004 (JP) ............................ 2004-251812

(51) Int. Cl.
*B41M 5/333* (2006.01)
*B41M 5/337* (2006.01)
*C09D 11/00* (2006.01)

(52) U.S. Cl. ..................... 503/209; 106/31.18; 503/216

(58) Field of Classification Search ....................... None
See application file for complete search history.

(56) References Cited

U.S. PATENT DOCUMENTS 5,609,672 A 3/1997 Hidaka et al. ............. 106/21 R

FOREIGN PATENT DOCUMENTS

| | | | |
|---|---|---|---|
| JP | 1-237191 | A | 9/1989 |
| JP | 2-76779 | A | 3/1990 |
| JP | 3-173689 | A | 7/1991 |
| JP | 4-310789 | A | 11/1992 |
| JP | 5-162455 | A | 6/1993 |
| JP | 5-309951 | A | 11/1993 |
| JP | 6-87270 | A | 3/1994 |
| JP | 7-314902 | A | 12/1995 |
| JP | 8-324126 | A | 12/1996 |
| JP | 9-207440 | A | 8/1997 |
| JP | 11-32112 | A | 11/1999 |
| JP | 2000-263935 | A | 9/2000 |
| JP | 2000-351276 | A | 12/2000 |
| JP | 2001-260541 | | 9/2001 |
| JP | 2001-310560 | A | 11/2001 |
| JP | 2002-200847 | A | 7/2002 |
| JP | 2002-326463 | A | 11/2002 |
| JP | 2003-94837 | A | 4/2003 |
| JP | 3428021 | B2 | 5/2003 |

*Primary Examiner*—Bruce H Hess
(74) *Attorney, Agent, or Firm*—Kubovcik & Kubovcik

(57) ABSTRACT

(1) A 4-hydroxy-4'-isopropoxydiphenylsulfone developer dispersion characterized by being obtained by wet grinding a 4-hydroxy-4'-isopropoxydiphenylsulfone developer in the presence of at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, or in the presence of 1,3,5-tris(4-tert-butyl-3-hydroxy-2,6-dimethylbenzyl)isocyanuric acid; (2) a method for wet grinding a 4-hydroxy-4'-isopropoxydiphenylsulfone developer, characterized by wet grinding a 4-hydroxy-4'-isopropoxydiphenylsulfone developer in the presence of at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, or in the presence of 1,3,5-tris(4-tert-butyl-3-hydroxy-2,6-dimethylbenzyl)isocyanuric acid; and (3) a heat-sensitive recording material having a heat-sensitive recording layer containing the developer dispersion.

30 Claims, No Drawings

4-HYDROXY-4'-ISOPROPOXYDIPHENYL SULFONE DEVELOPER DISPERSION, METHOD OF WET GRINDING, AND THERMAL RECORDING MEDIA

This application is a 371 of international application PCT/JP2005/004535, which claims priority based on Japanese patent application Nos. 2004-72352, 2004-166693 and 2004-251812 filed Mar. 15, Jun. 4 and Aug. 31, 2004, respectively, which are incorporated herein by reference.

TECHNICAL FIELD

The present invention relates to a 4-hydroxy-4'-isopropoxydiphenylsulfone developer dispersion used for heat-sensitive recording materials, a method for wet grinding, and a heat-sensitive recording material obtained by using the developer dispersion.

BACKGROUND OF THE INVENTION

Heat-sensitive recording materials, which are in wide practical use, record color images taking advantage of a heat-induced color development reaction between a usually colorless or lightly colored leuco dye and a phenol or an organic acid. Such heat-sensitive recording materials have advantages in that, for example, color images can be formed simply by the application of heat, and further, recording devices therefor can be relatively compact, easily maintained, and noise-free. For this reason, heat-sensitive recording materials have been used in a broad range of technical fields as information-recording materials for facsimile machines, output devices for computers, printing devices such as label printers, automatic ticket vending machines, CD/ATMs, order form output devices for use in family restaurants, data output devices in apparatuses for scientific research, etc.

As the application field for heat-sensitive recording materials continues to expand, there is an increasing likelihood that heat-sensitive recording materials will come into contact with cosmetic creams, oils, or polymer sheets containing plasticizers, or that they will be exposed to severe conditions such as high temperatures and humidity. Such situations also increase the likelihood of problems. For example, with respect to heat-sensitive recording materials obtained by using 2,2-bis(4-hydroxyphenyl)propane (i.e., bisphenol A), p-hydroxybenzyl benzoate, etc., which are conventionally used as developers, when the materials are exposed to high temperatures and/or high humidity, the image density is degraded. When such a heat-sensitive recording material comes into contact with a plasticizer, oil, etc., the image often fades to an extent that it becomes unreadable. Further, under severe conditions such as high temperatures and humidity, unprinted areas become colored, and so-called grayish occurs.

Various hydroxydiphenylsulfone derivatives have been developed and used as developers that are capable of solving these problems. It is known that 4-hydroxy-4'-isopropoxydiphenylsulfone in particular has advantages in that the brightness and sensitivity of obtained heat-sensitive recording layers are high, the preservative properties of obtained recorded images are excellent, etc.

In general, the ingredients of heat-sensitive recording materials, such as leuco dyes, developers and sensitizers, are made into particles by wet grinding before use. In recent years, with an increasing demand for higher sensitivity in heat-sensitive recording materials, the micronization of these particles has been pursued. The microparticulation of 4-hydroxy-4'-isopropoxydiphenylsulfone, however, sometimes causes crystal growth during wet grinding for microparticulation or during the storage of the prepared dispersion. Crystal growth tends to occur especially when 4-hydroxy-4'-isopropoxydiphenylsulfone is ground into microparticles of 1 μm or less. Such crystal growth is attributed to the hydration of 4-hydroxy-4'-isopropoxydiphenylsulfone, the grown crystals being hydrates. Heat-sensitive recording materials produced using a dispersion that contains such a hydrate often suffer from fogging.

According to known methods, in order to prevent hydration of 4-hydroxy-4'-isopropoxydiphenylsulfone, dispersions may be prepared using a specific amount of an alkylated bis(4-hydroxyphenyl)sulfone compound (see patent document 1), using a compound selected from the group consisting of bis(4-hydroxyphenyl)sulfone and metallic salts thereof (see patent document 2), using a specific amount of 4,4'-diisopropoxydiphenylsulfone (see patent document 3), or using a specific amount of diphenyl sulfone derivatives of a specific chemical formula (see patent document 4).

Likewise, according to other known methods, in order to prevent hydration, hydroxypropylcellulose may be used during dispersion (see patent document 5), at least one compound selected from the group consisting of metylcellulose and hydroxyethyl methylcellulose may be used during dispersion (see patent document 6), or hydroxypropyl methylcellulose may be used (see patent document 7). However, there are problems in that, for example, the saturation concentration and sensitivity of such a heat-sensitive recording material upon color development are lowered, and much time is consumed before it is dispersed to a desired particle diameter, causing reduced dispersion efficiency.

Also known is a heat-sensitive recording material containing a dispersion obtained by simultaneously wet dispersing 4-hydroxy-4'-isopropoxydiphenylsulfone and a thermoplastic material having a melting point of 130° C. or less, using a sulfone-modified polyvinyl alcohol as a dispersant (see patent document 8).

According to patent document 8, the obtained heat-sensitive recording material is excellent especially in recording sensitivity, and it resists grayish. However, a thermoplastic material having a melting point of 130° C. or less, such as 1,1,3-tris(2-methyl-4-hydroxy-5-cyclohexylphenyl)butane, 1,1,3-tris(2-methyl-4-hydroxy-5-tert-butylphenyl)butane, or 1,3,5-tris(4-tert-butyl-3-hydroxy-2,6-dimethylbenzyl)isocyanuric acid, is used for the purpose of improving recording sensitivity, and its blending proportion to 4-hydroxy-4'-isopropoxydiphenylsulfone is so large that the preferable amount is 30 to 200 wt %. Although patent document 8 discloses that sulfone-modified polyvinyl alcohol can prevent the hydration of 4-hydroxy-4'-isopropoxydiphenylsulfone during wet grinding, sufficient measures to prevent fogging have not yet been achieved.

Heat-sensitive recording materials are sometimes exposed to relatively high temperatures while being stored, while being set in a device, or after printing. Grayish under these conditions must be avoided. The density of an unprinted area after contact with a 70° C. iron plate for 5 seconds is usable as a scale for grayish. This is defined as the property of static sensitivity. It is preferable that such a value be as small as possible. Practically, a value of 0.2 or less is preferable.

Patent document 1: Japanese Unexamined Patent Publication 1996-324126

Patent document 2: Japanese Unexamined Patent Publication 1990-76779

Patent document 3: Japanese Unexamined Patent Publication 1995-314902

Patent document 4: W095/018018

Patent document 5: Japanese Unexamined Patent Publication 1993-162455

Patent document 6: Japanese Unexamined Patent Publication 1993-309951

Patent document 7: Japanese Unexamined Patent Publication 1989-237191

Patent document 8: Japanese Unexamined Patent Publication 1997-207440

DISCLOSURE OF THE INVENTION

Problems to be Solved by the Invention

The present invention provides a novel measure capable of preventing hydration, i.e., crystal growth, for the preparation of a dispersion by wet grinding a 4-hydroxy-4'-isopropoxydiphenylsulfone developer. The present invention further provides a heat-sensitive recording material having a heat-sensitive recording layer obtained by using such a dispersion, the recording material having high brightness and high sensitivity as well as reduced grayish, and which further exhibits excellent property of static sensitivity and does not show abnormal color development even at high temperatures.

Means for Solving the Problems

As a result of research based on the above knowledge, the present inventors found that hydration during wet grinding of 4-hydroxy-4'-isopropoxydiphenylsulfone developer can be prevented by employing, as a hydration inhibitor, at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, or alternatively 1,3,5-tris(4-tert-butyl-3-hydroxy-2,6-dimethylbenzyl) isocyanuric acid. After further study, the present inventors accomplished the present invention.

That is, the present invention provides the following 4-hydroxy-4'-isopropoxydiphenylsulfone developer dispersions, methods for wet grinding a 4-hydroxy-4'-isopropoxydiphenylsulfone developer, and heat-sensitive recording materials obtained by using such dispersions.

Item 1: A 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being:

(i) at least one compound selected from the group consisting of 1,1,3-tris(2-methyl-4-hydroxy-5-cyclohexylphenyl) butane and 1,1,3-tris(2-methyl-4-hydroxy-5-tert-butylphenyl)butane, or (ii) 1,3,5-tris(4-tert-butyl-3-hydroxy-2,6-dimethylbenzyl) isocyanuric acid, the proportion of the hydration inhibitor being 0.02 to 25 parts by mass per 100 parts by mass of the developer.

Item 2: A dispersion according to Item 1, wherein the hydration inhibitor is at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane.

That is, a dispersion according to Item 1, obtainable (or obtained) by wet grinding a 4-hydroxy-4'-isopropoxydiphenylsulfone developer in the presence at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, wherein the proportion of said at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane is 0.02 to 25 parts by mass per 100 parts by mass of the developer.

Item 3: A dispersion according to Item 1, wherein the hydration inhibitor is 1,3,5-tris(4-tert-butyl-3-hydroxy-2,6-dimethylbenzyl) isocyanuric acid.

That is, a dispersion according to Item 1, obtainable (or obtained) by wet grinding a 4-hydroxy-4'-isopropoxydiphenylsulfone developer in the presence of 1,3,5-tris(4-tert-butyl-3-hydroxy-2,6-dimethylbenzyl)isocyanuric acid, wherein the proportion of the 1,3,5-tris(4-tert-butyl-3-hydroxy-2,6-dimethylbenzyl)isocyanuric acid is 0.02 to 25 parts by mass per 100 parts by mass of the developer.

Item 4: A dispersion according to any one of Items 1 to 3, wherein the proportion of the hydration inhibitor is 0.05 to 10 parts by mass per 100 parts by mass of the 4-hydroxy-4'-isopropoxydiphenylsulfone developer.

Item 5: A dispersion according to any one of Items 1 to 4, obtainable (or obtained) by wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

In particular, a dispersion according to Item 1 or 4, obtainable (obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, and (B) at least one member selected from the group consisting of hydroxypropyl methylcellulose, hydroxyethyl methylcellulose, hydroxyethylcellulose and methylcellulose.

Item 6: A dispersion according to any one of Items 1 to 4, obtainable (or obtained) by wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

In particular, a 4-hydroxy-4'-isopropoxydiphenylsulfone developer dispersion according to Item 1 or 4, obtainable (obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

Item 7: A dispersion according to Item 5 or 6, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

Item 8: A dispersion according to Item 6 or 7, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

Item 9: A dispersion according to any one of Items 1 to 8, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

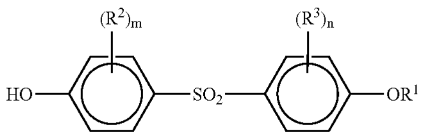

[Chemical Formula 1]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxydiphenylsulfone.

In particular, a dispersion according to any one of Items 1 to 8, wherein the developer comprises, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by general formula (1), and less than 0.01 parts by mass of 4,4'-diisopropoxydiphenylsulfone; or a dispersion according to any one of Items 1 to 8, wherein the developer comprises, per 100 parts by mass of 4-hydroxy-4'-isopropoxydiphenylsulfone:

less than 0.02 parts by mass of compound(s) selected from bis(4-hydroxyphenyl)sulfone and metallic salts thereof, less than 0.03 parts by mass of one or more compounds selected from diphenylsulfone derivatives represented by general formula (1), and less than 0.01 parts by mass of 4,4'-diisopropoxydiphenylsulfone, respectively.

Item 10: A method for wet grinding a 4-hydroxy-4'-isopropoxydiphenylsulfone developer, comprising the step of wet grinding a 4-hydroxy-4'-isopropoxydiphenylsulfone developer in the presence of a hydration inhibitor, the hydration inhibitor being:

(i) at least one compound selected from the group consisting of 1,1,3-tris(2-methyl-4-hydroxy-5-cyclohexylphenyl) butane and 1,1,3-tris(2-methyl-4-hydroxy-5-tert-butylphenyl)butane, or (ii) 1,3,5-tris(4-tert-butyl-3-hydroxy-2,6-dimethylbenzyl) isocyanuric acid, the proportion of the hydration inhibitor being 0.02 to 25 parts by mass per 100 parts by mass of the developer.

Item 11: A method according to Item 10, wherein the hydration inhibitor is at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane.

That is, a method according to Item 10, comprising the step of wet grinding a 4-hydroxy-4'-isopropoxydiphenylsulfone developer in the presence of at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, wherein the proportion of said at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane is 0.02 to 25 parts by mass per 100 parts by mass of the developer.

Item 12: A method according to Item 10, wherein the hydration inhibitor is 1,3,5-tris(4-tert-butyl-3-hydroxy-2,6-dimethylbenzyl)isocyanuric acid.

That is, a method according to Item 10, comprising the step of wet grinding a 4-hydroxy-4'-isopropoxydiphenylsulfone developer in the presence of 1,3,5-tris(4-tert-butyl-3-hydroxy-2,6-dimethylbenzyl)isocyanuric acid, wherein the proportion of 1,3,5-tris(4-tert-butyl-3-hydroxy-2,6-dimethylbenzyl)isocyanuric acid is 0.02 to 25 parts by mass per 100 parts by mass of the developer.

Item 13: A method according to any one of Items 10 to 12, wherein the proportion of the hydration inhibitor is 0.05 to 10 parts by mass per 100 parts by mass of the 4-hydroxy-4'-isopropoxydiphenylsulfone developer.

Item 14: A method according to any one of Items 10 to 13, comprising the step of wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

In particular, a method according to Item 10 or 13, comprising the step of wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, and (B) at least one member selected from the group consisting of hydroxypropyl methylcellulose, hydroxyethyl methylcellulose, hydroxyethylcellulose and methylcellulose.

Item 15: A method according to any one of Items 10 to 13, comprising the step of wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

In particular, a method according to Item 10 or 13, comprising the step of wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

Item 16: A method according to Item 14 or 15, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

Item 17: A method according to Item 15 or 16, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

Item 18: A method according to any one of Items 10 to 17, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

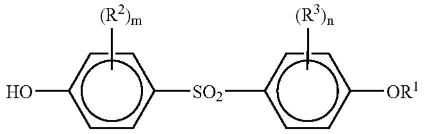

[Chemical Formula 2]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxydiphenylsulfone.

In particular, a method according to any one of Items 10 to 17, wherein the developer comprises, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by general formula (1), and less than 0.01 parts by mass of 4,4'-diisopropoxydiphenylsulfone; or a method according to any one of Items 10 to 17, wherein the developer comprises, per 100 parts by mass of 4-hydroxy-4'-isopropoxydiphenylsulfone:

less than 0.02 parts by mass of compound(s) selected from bis(4-hydroxyphenyl)sulfone and metallic salts thereof, less than 0.03 parts by mass of one or more compounds selected from diphenylsulfone derivatives represented by general formula (1), and less than 0.01 parts by mass of 4,4'-diisopropoxydiphenylsulfone.

Item 19: A heat-sensitive recording material comprising a sheet-like substrate and a heat-sensitive recording layer formed on at least one surface of the sheet-like substrate, the heat-sensitive recording layer being formed by coating the sheet-like substrate with a heat-sensitive recording layer coating composition comprising a substantially colorless dye precursor and a developer, and then drying the coating, the heat-sensitive recording layer coating composition containing a 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being:

(i) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, or (ii) 1,3,5-tris(4-tert-butyl-3-hydroxy-2,6-dimethylbenzyl)isocyanuric acid, the proportion of the hydration inhibitor being 0.02 to 25 parts by mass per 100 parts by mass of the developer.

Preferably, the heat-sensitive recording material comprises a sheet-like substrate and a heat-sensitive recording layer formed on at least one surface of the sheet-like substrate, the heat-sensitive recording layer being formed by coating the sheet-like substrate with a heat-sensitive recording layer coating composition comprising a substantially colorless dye precursor and a developer, and then drying the coating, the heat-sensitive recording layer coating composition containing a 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being:

(i) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, or (ii) 1,3,5-tris(4-tert-butyl-3-hydroxy-2,6-dimethylbenzyl)isocyanuric acid, the proportion of the hydration inhibitor being 0.05 to 10 parts by mass per 100 parts by mass of the developer.

Item 20: A heat-sensitive recording material according to Item 19, wherein the hydration inhibitor is at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane.

Item 21: A heat-sensitive recording material according to Item 19, wherein the hydration inhibitor is 1,3,5-tris(4-tert-butyl-3-hydroxy-2,6-dimethylbenzyl)isocyanuric acid.

Item 22: A heat-sensitive recording material according to any one of Items 19 to 21, wherein the 4-hydroxy-4'-isopropoxydiphenylsulfone developer dispersion is obtainable (or obtained) by wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

In particular, a heat-sensitive recording material according to Item 19, wherein the 4-hydroxy-4'-isopropoxydiphenylsulfone developer dispersion is obtainable (or obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, and (B) at least one dispersing binder selected from the group consisting of hydroxypropyl methylcellulose, hydroxyethyl methylcellulose, hydroxyethylcellulose and methylcellulose.

Item 23: A heat-sensitive recording material according to any one of Items 19 to 22, wherein the 4-hydroxy-4'-isopropoxydiphenylsulfone developer dispersion is obtainable (or obtained) by wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

In particular, a heat-sensitive recording material according to Item 19, wherein the 4-hydroxy-4'-isopropoxydiphenylsulfone developer dispersion is obtainable (or obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

Item 24: A heat-sensitive recording material according to Item 22 or 23, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

Item 25: A heat-sensitive recording material according to Item 23 or 24, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

Item 26: A heat-sensitive recording material according to any one of Items 19 to 25, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

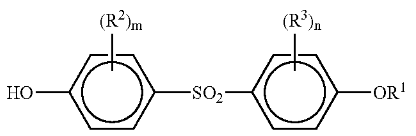

[Chemical Formula 3]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxydiphenylsulfone.

Item 27: A heat-sensitive recording material comprising a sheet-like substrate and a heat-sensitive color-developing layer formed on at least one surface of the sheet-like substrate, the heat-sensitive color-developing layer being formed by coating the sheet-like substrate with a heat-sensitive color-developing layer coating composition comprising a substantially colorless dye precursor and a developer, and then drying the coating, the heat-sensitive color-developing layer coating composition containing a 4-hydroxy-4'-isopropoxydiphenylsulfone developer dispersion of any one of Items 1 to 9.

Effect of the Invention

The present invention provides a novel measure capable of preventing hydration, i.e., crystal growth, for the preparation of a dispersion by wet grinding a 4-hydroxy-4'-isopropoxydiphenylsulfone developer.

The present invention particularly provides a novel measure capable of preventing hydration, i.e., crystal growth, even when the 4-hydroxy-4'-isopropoxydiphenylsulfone developer is of high purity.

Using the invention, it is possible to wet grind and thereby pulverize a 4-hydroxy-4'-isopropoxydiphenylsulfone developer, without causing hydration, to an average particle size of 2 μm or less.

Because hydration does not occur during wet grinding, a dispersion of 4-hydroxy-4'-isopropoxydiphenylsulfone developer microparticles can be easily obtained.

Further, it is possible to prevent fogging in a heat-sensitive recording material during storage or under high temperatures and humidity, which would otherwise be caused due to the formation of hydrates.

Accordingly, by using the developer dispersion of the present invention, a heat-sensitive recording material having high brightness and high sensitivity as well as reduced grayish, and which further exhibits excellent property of static sensitivity and does not show abnormal color development even at high temperatures, can be obtained.

BEST MODE FOR CARRYING OUT THE INVENTION

In the present invention, a 4-hydroxy-4'-isopropoxydiphenylsulfone developer is wet ground in the presence of:

at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane; or 1,3,5-tris(4-tert-butyl-3-hydroxy-2,6-dimethylbenzyl)isocyanuric acid.

4-Hydroxy-4'-isopropoxydiphenylsulfone developer

The 4-hydroxy-4'-isopropoxydiphenylsulfone developer for use in the present invention preferably has a high purity.

In other words, it is preferable that the 4-hydroxy-4'-isopropoxydiphenylsulfone developer contain little or substantially no 4,4'-diisopropoxydiphenylsulfone, which is a by-product of the production of 4-hydroxy-4'-isopropoxydiphenylsulfone; bis(4-hydroxyphenyl)sulfone, which is a raw material for 4-hydroxy-4'-isopropoxydiphenylsulfone; metal salts of bis(4-hydroxyphenyl)sulfone; or diphenylsulfone derivatives represented by Formula (1):

(1)

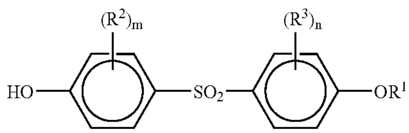

[Formula 4]

(wherein $R^1$ represents a hydrogen atom or isopropyl group, $R^2$ and $R^3$ each independently represent an isopropyl group, and n and m each independently represent 0, 1 or 2, with the proviso that n and m are not both 0).

The purity of the developer is approximately such that, per 100 parts by mass of 4-hydroxy-4'-isopropoxydiphenylsulfone:

the total content of compound(s) selected from bis (4-hydroxyphenyl) sulfone and metal salts thereof is not more than 0.02 parts by mass, preferably less than 0.02 parts by mass, more preferably less than 0.01 parts by mass, and even more preferably substantially 0 (below the detection limit);

the total content of one or more compounds selected from diphenylsulfone derivatives represented by Formula (1) is not more than 0.05 parts by mass, preferably less than 0.03 parts by mass, more preferably less than 0.01 parts by mass, and even more preferably substantially 0 (below the detection limit); and the 4,4'-diisopropoxydiphenylsulfone content is not more than 0.01 parts by mass, preferably less than 0.01 parts by mass, more preferably less than 0.002 parts by mass, and even more preferably substantially 0 (below the detection limit).

Hydration Inhibitor

In the present invention, a dispersion is prepared by wet grinding a 4-hydroxy-4'-isopropoxydiphenylsulfone developer in the presence of a hydration inhibitor, thereby inhibiting hydration of 4-hydroxy-4'-isopropoxydiphenylsulfone.

The hydration inhibitor for use in the present invention is:

(i) at least one compound selected from the group consisting of 1,1,3-tris(2-methyl-4-hydroxy-5-cyclohexylphenyl) butane and 1,1,3-tris(2-methyl-4-hydroxy-5-tert-butylphenyl)butane; or (ii) 1,3,5-tris(4-tert-butyl-3-hydroxy-2,6-dimethylbenzyl) isocyanuric acid.

The following are descriptions on an embodiment in which the hydration inhibitor is compound (i) (first embodiment), and an embodiment in which the hydration inhibitor is compound (ii) (second embodiment).

First Embodiment

The first embodiment of the present invention encompasses a 4-hydroxy-4'-isopropoxydiphenylsulfone developer dispersion obtained by wet grinding a 4-hydroxy-4'-isopropoxydiphenylsulfone developer in the presence of at least one compound selected from the group consisting of 1,1,3-tris(2-methyl-4-hydroxy-5-cyclohexylphenyl)butane and 1,1,3-tris (2-methyl-4-hydroxy-5-tert-butylphenyl)butane.

This embodiment also encompasses a method of wet grinding a 4-hydroxy-4'-isopropoxydiphenylsulfone developer, the method comprising the step of wet grinding a 4-hydroxy-4'-isopropoxydiphenylsulfone developer in the presence of at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane.

1,1,3-Tris(2-methyl-4-hydroxy-5-cyclohexylphenyl)butane and 1,1,3-tris(2-methyl-4-hydroxy-5-tert-butylphenyl)butane In the first embodiment, at least one compound selected from the group consisting of 1,1,3-tris(2-methyl-4-hydroxy-5-cyclohexylphenyl)butane and 1,1,3-tris (2-methyl-4-hydroxy-5-tert-butylphenyl) butane is used to inhibit hydration, i.e., to prevent the formation of hydrates, in a wet grinding process.

The amount of said at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane is preferably 0.02 to 25 parts by mass, and more preferably 0.05 to 10 parts by mass, per 100 parts by mass of 4-hydroxy-4'-isopropoxydiphenylsulfone developer.

When the amount is not less than 0.02 parts by mass, a high hydrate formation inhibitory effect is achieved, and when the amount is not more than 25 parts by mass, it is unlikely that the sensitivity of the resulting heat-sensitive recording material will be reduced.

Water-soluble Polymer

In the first embodiment of the present invention, it is preferable to use a water-soluble polymer for efficient dispersion.

Examples of water-soluble polymers include methylcellulose, carboxymethylcellulose, hydroxyethylcellulose, hydroxyethyl methylcellulose, hydroxypropylcellulose, hydroxypropyl methylcellulose, starch and derivatives thereof, completely or partially saponified polyvinyl alcohols, carboxy-modified polyvinyl alcohols, sulfone-modified polyvinyl alcohols, polyacrylamides, etc.

It is especially preferable to use at least one member selected from the group consisting of hydroxypropyl methylcellulose, hydroxyethyl methylcellulose, hydroxyethylcellulose and methylcellulose, together with a sulfone-modified polyvinyl alcohol.

The amount of water-soluble polymer to be added is about 0.1 to about 20 parts by mass, and preferably about 0.2 to about 20 parts by mass, per 100 parts by mass of 4-hydroxy-4'-isopropoxydiphenylsulfone developer.

At Least One Member Selected from the Group Consisting of Hydroxypropyl Methylcellulose, Hydroxyethyl Methylcellulose, Hydroxyethylcellulose and Methylcellulose In the first embodiment of the present invention, to improve the hydration inhibitory effect, it is preferable to use at least one dispersing binder selected from the group consisting of hydroxypropyl methylcellulose, hydroxyethyl methylcellulose, hydroxyethylcellulose and methylcellulose. A substance that functions as both a dispersant and a binder is referred to as a "dispersing binder".

That is, the first embodiment encompasses a 4-hydroxy-4'-isopropoxydiphenylsulfone developer dispersion obtainable (or obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane; and (B) at least one member selected from the group consisting of hydroxypropyl methylcellulose, hydroxyethyl methylcellulose, hydroxyethylcellulose and methylcellulose.

The first embodiment also encompasses a method of wet grinding a 4-hydroxy-4'-isopropoxydiphenylsulfone developer, the method comprising the step of wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane; and (B) at least one member selected from the group consisting of hydroxypropyl methylcellulose, hydroxyethyl methylcellulose, hydroxyethylcellulose and methylcellulose.

The use of a dispersing binder in the wet grinding of a 4-hydroxy-4'-isopropoxydiphenylsulfone developer further improves the inhibitory effect on hydration of 4-hydroxy-4'-isopropoxydiphenylsulfone.

The proportion of dispersing binder is preferably about 0.2 to about 15 parts by mass, and more preferably about 0.3 to about 5 parts by mass, per 100 parts by mass of 4-hydroxy-4'-isopropoxydiphenylsulfone developer.

Use of not less than 0.2 parts by mass of dispersing binder results in a high hydrate formation inhibitory effect, and use of not more than 15 parts by mass of dispersing binder is unlikely to reduce the sensitivity of the resulting heat-sensitive recording material.

Sulfone-modified Polyvinyl Alcohol

In the first embodiment of the present invention, to further improve the dispersion efficiency and obtain a heat-sensitive recording material with higher sensitivity, it is preferable to use a sulfone-modified polyvinyl alcohol.

That is, the first embodiment also encompasses a 4-hydroxy-4'-isopropoxydiphenylsulfone developer dispersion obtainable (or obtained) by wet grinding a 4-hydroxy-4'-isopropoxydiphenylsulfone developer in the presence of:

(A) at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane;

(B) at least one member selected from the group consisting of hydroxypropyl methylcellulose, hydroxyethyl methylcellulose, hydroxyethylcellulose and methylcellulose; and (C) a sulfone-modified polyvinyl alcohol.

The first embodiment further encompasses a method of wet grinding a 4-hydroxy-4'-isopropoxydiphenylsulfone developer, the method comprising the step of wet grinding a 4-hydroxy-4'-isopropoxydiphenylsulfone developer in the presence of:

(A) At least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane;

(B) at least one member selected from the group consisting of hydroxypropyl methylcellulose, hydroxyethyl methylcellulose, hydroxyethyl cellulose and methylcellulose; and (C) a sulfone-modified polyvinyl alcohol.

The use of a sulfone-modified polyvinyl alcohol is preferable since it further improves dispersion efficiency and provides a heat-sensitive recording material with higher sensitivity.

The combined use of a dispersing binder and sulfone-modified polyvinyl alcohol increases the inhibitory effect on the formation of hydrates of 4-hydroxy-4'-isopropoxydiphenylsulfone, and enables more efficient dispersion into fine particles.

The amount of said at least one compound selected from the group consisting of hydroxypropyl methylcellulose, hydroxyethyl methylcellulose, hydroxyethylcellulose and methylcellulose is preferably 2 to 2000 parts by mass, and more preferably 20 to 1000 parts by mass.

When the amount is not less than 2 parts by mass, a high hydrate formation inhibitory effect is achieved, and when the amount is not more than 2000 parts by mass, high dispersion efficiency is attained, and it is unlikely that the sensitivity of the resulting heat-sensitive recording material will be reduced.

Method of Dispersion Preparation

In the first embodiment of the present invention, the dispersion can be prepared by wet grinding, in an aqueous medium, a 4-hydroxy-4'-isopropoxydiphenylsulfone developer together with a predetermined amount of at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane.

The dispersion can also be obtained by first preparing a composition containing a 4-hydroxy-4'-isopropoxydiphenylsulfone developer, at least one compound selected from the group consisting of 1,1,3-tris(2-methyl-4-hydroxy-5-cyclohexylphenyl)butane and 1,1,3-tris (2-methyl-4-hydroxy-5-tert-butylphenyl)butane, and preferably water-soluble polymer(s); and then wet grinding the composition.

Alternatively, the dispersion can be obtained by first preparing a composition in which at least one compound selected from the group consisting of 1,1,3-tris(2-methyl-4-hydroxy-5-cyclohexylphenyl)butane and 1,1,3-tris(2-methyl-4-hydroxy-5-tert-butylphenyl)butane is dispersed in a dispersing binder; then adding a 4-hydroxy-4'-isopropoxydiphenylsulfone developer; and preferably further adding a sulfone-modified polyvinyl alcohol and/or other water-soluble polymer(s); followed by wet grinding.

The wet grinding can be performed by using a grinder such as a ball mill, sand grinder or the like.

It is preferable to perform wet grinding until the average particle diameter of the 4-hydroxy-4'-isopropoxydiphenylsulfone in the dispersion becomes about 0.2 to about 2 μm, and preferably about 0.5 to about 1.8 μm.

An average particle diameter of not less than 0.2 μm achieves a high hydrate formation inhibitory effect, and an average particle diameter of not more than 2 μm is unlikely to reduce the sensitivity of the resulting heat-sensitive recording material.

As used herein, the average particle diameter means D50 measured with a Shimadzu laser diffraction particle size distribution analyzer (tradename: SALD-2000).

Auxiliaries such as surfactants, anti-foaming agents, preservatives, etc., may be added to the dispersion before or after wet grinding.

Second Embodiment

The second embodiment of the present invention encompasses a 4-hydroxy-4'-isopropoxydiphenylsulfone developer dispersion obtained by wet grinding a 4-hydroxy-4'-isopropoxydiphenylsulfone developer in the presence of 1,3,5-tris (4-tert-butyl-3-hydroxy-2,6-dimethylbenzyl)isocyanuric acid.

The second embodiment also encompasses a method of wet grinding a 4-hydroxy-4'-isopropoxydiphenylsulfone developer, the method comprising the step of wet grinding a 4-hydroxy-4'-isopropoxydiphenylsulfone developer in the presence of 1,3,5-tris(4-tert-butyl-3-hydroxy-2,6-dimethylbenzyl)isocyanuric acid.

1,3,5-tris(4-tert-butyl-3-hydroxy-2,6-dimethyl benzyl)isocyanuric acid

In the second embodiment of the present invention, 1,3,5-tris(4-tert-butyl-3-hydroxy-2,6-dimethylbenzyl)isocyanuric acid is used to inhibit hydration, i.e., to prevent the formation of hydrates, in a wet grinding process.

The amount of 1,3,5-tris(4-tert-butyl-3-hydroxy-2,6-dimethylbenzyl)isocyanuric acid is preferably 0.02 to 25 parts by mass, and more preferably 0.05 to 10 parts by mass, per 100 parts by mass of 4-hydroxy-4'-isopropoxydiphenylsulfone developer.

When the amount is not less than 0.02 parts by mass, a high hydrate formation inhibitory effect is achieved, and when the amount is not more than 25 parts by mass, it is unlikely that the sensitivity of the resulting heat-sensitive recording material will be reduced.

Water-soluble Polymer

In the second embodiment of the present invention, it is preferable to use a water-soluble polymer for efficient dispersion.

Examples of water-soluble polymers include methylcellulose, carboxymethylcellulose, hydroxyethylcellulose, hydroxyethyl methylcellulose, hydroxypropylcellulose, hydroxypropyl methylcellulose, starch and derivatives thereof, completely or partially saponified polyvinyl alcohols, carboxy-modified polyvinyl alcohols, sulfone-modified polyvinyl alcohols, polyacrylamides, etc.

It is especially preferable to use at least one member selected from the group consisting of hydroxypropyl methylcellulose, hydroxyethyl methylcellulose, hydroxyethylcellulose and methylcellulose, together with a sulfone-modified polyvinyl alcohol.

The amount of water-soluble polymer to be added is about 0.1 to about 20 parts by mass, and preferably about 0.2 to 20 parts by mass, per 100 parts by mass of 4-hydroxy-4'-isopropoxydiphenylsulfone developer.

At Least One Member Selected from the Group Consisting of Hydroxypropyl Methylcellulose, Hydroxyethyl Methylcellulose, Hydroxyethylcellulose and Methylcellulose In the second embodiment of the present invention, to further improve the hydration inhibitory effect, it is preferable to use at least one dispersing binder selected from the group consisting of hydroxypropyl methylcellulose, hydroxyethyl methylcellulose, hydroxyethylcellulose and methylcellulose.

In other words, the second embodiment encompasses a 4-hydroxy-4'-isopropoxydiphenylsulfone dispersion obtainable (or obtained) by wet grinding a 4-hydroxy-4'-isopropoxydiphenylsulfone developer in the presence of:

(A) 1,3,5-tris(4-tert-butyl-3-hydroxy-2,6-dimethyl benzyl)isocyanuric acid and (B) at least one member selected from the group consisting of hydroxypropyl methylcellulose, hydroxyethyl methylcellulose, hydroxyethylcellulose and methylcellulose.

The second embodiment also encompasses a method of wet grinding a 4-hydroxy-4'-isopropoxydiphenylsulfone developer, the method comprising the step of wet grinding a 4-hydroxy-4'-isopropoxydiphenylsulfone developer in the presence of:

(A) 1,3,5-tris(4-tert-butyl-3-hydroxy-2,6-dimethylbenzyl) isocyanuric acid and (B) at least one member selected from the group consisting of hydroxypropyl methylcellulose, hydroxyethyl methylcellulose, hydroxyethylcellulose and methylcellulose.

The use of a dispersing binder to obtain the developer dispersion further improves the inhibitory effect on the formation of hydrates of 4-hydroxy-4'-isopropoxydiphenylsulfone.

The proportion of dispersing binder is preferably 0.2 to 15 parts by mass, and more preferably 0.3 to 5 parts by mass, per 100 parts by mass of 4-hydroxy-4'-isopropoxydiphenylsulfone developer.

Use of not less than 0.2 parts by mass of dispersing binder achieves a high hydrate formation inhibitory effect, and use of not more than 15 parts by mass of dispersing binder is unlikely to reduce the sensitivity of the resulting heat-sensitive recording material.

Sulfone-modified Polyvinyl Alcohol

In the second embodiment of the present invention, it is preferable to use a sulfone-modified polyvinyl alcohol to further improve the dispersion efficiency and obtain a heat-sensitive recording material with higher sensitivity.

That is, the second embodiment encompasses a 4-hydroxy-4'-isopropoxydiphenylsulfone developer dispersion obtainable (or obtained) by wet grinding a 4-hydroxy-4'-isopropoxydiphenylsulfone developer in the presence of:

(A) 1,3,5-tris(4-tert-butyl-3-hydroxy-2,6-dimethylbenzyl) isocyanuric acid;

(B) at least one member selected from the group consisting of hydroxypropyl methylcellulose, hydroxyethyl methylcellulose, hydroxyethylcellulose and methylcellulose; and (C) a sulfone-modified polyvinyl alcohol.

The second embodiment also encompasses a method of wet grinding a 4-hydroxy-4'-isopropoxydiphenylsulfone developer, the method comprising the step of wet grinding the 4-hydroxy-4'-isopropoxydiphenylsulfone developer in the presence of:

(A) 1,3,5-tris(4-tert-butyl-3-hydroxy-2,6-dimethylbenzyl) isocyanuric acid;

(B) at least one member selected from the group consisting of hydroxypropyl methylcellulose, hydroxyethyl methylcellulose, hydroxyethylcellulose and methylcellulose; and (C) a sulfone-modified polyvinyl alcohol.

The use of a sulfone-modified polyvinyl alcohol is preferable since it further improves the dispersion efficiency and provides a heat-sensitive recording material with higher sensitivity.

The combined use of a dispersing binder and sulfone-modified polyvinyl alcohol achieves a higher inhibitory effect on the formation of hydrates of 4-hydroxy-4'-isopropoxydiphenylsulfone, and enables more efficient dispersion into fine particles.

The amount of said at least one compound selected from the group consisting of hydroxypropyl methylcellulose, hydroxyethyl methylcellulose, hydroxyethylcellulose and methylcellulose is preferably 2 to 2000 parts by mass, and more preferably 20 to 1000 parts by mass, per 100 parts by mass of sulfone-modified polyvinyl alcohol.

When the amount is not less than 2 parts by mass, a high hydrate formation inhibitory effect is achieved, and when the amount is not more than 2000 parts by mass, high dispersion efficiency is attained, and it is unlikely that the sensitivity of the resulting heat-sensitive recording material will be reduced.

Method of Dispersion Preparation

In the second embodiment of the present invention, the dispersion can be prepared by wet grinding, in an aqueous medium, a 4-hydroxy-4'-isopropoxydiphenylsulfone developer together with a predetermined amount of 1,3,5-tris(4-tert-butyl-3-hydroxy-2,6-dimethylbenzyl)isocyanuric acid.

The dispersion can also be obtained by first preparing a composition containing a 4-hydroxy-4'-isopropoxydiphenylsulfone developer, 1,3,5-tris(4-tert-butyl-3-hydroxy-2,6-dimethylbenzyl)isocyanuric acid, and preferably a water-soluble polymer, and wet grinding the composition.

Alternatively, the dispersion can be obtained by first preparing a composition in which 1,3,5-tris(4-tert-butyl-3-hydroxy-2,6-dimethylbenzyl)isocyanuric acid is dispersed in a dispersing binder; then adding a 4-hydroxy-4'-isopropoxydiphenylsulfone developer to the composition; and preferably further adding a sulfone-modified polyvinyl alcohol and/or other water-soluble polymer(s); followed by wet grinding.

The wet grinding can be performed by using a grinder such as a ball mill, sand grinder or the like.

It is preferable to perform wet grinding until the average particle diameter of the 4-hydroxy-4'-isopropoxydiphenylsulfone in the dispersion becomes about 0.2 to about 2 μm, and preferably about 0.5 to about 1.8 μm.

An average particle diameter of not less than 0.2 μm achieves a high hydrate formation inhibitory effect, and an average particle diameter of not more than 2 μm is unlikely to reduce the sensitivity of the resulting heat-sensitive recording material.

As used herein, the average particle diameter means D50 measured with a Shimadzu laser diffraction particle size distribution analyzer (tradename: SALD-2000).

Auxiliaries such as surfactants, anti-foaming agents, preservatives, etc. may be added to the dispersion before or after wet grinding.

Heat-sensitive Recording Material

The heat-sensitive recording material of the present invention comprises, as a developer, the 4-hydroxy-4'-isopropoxydiphenylsulfone developer dispersion of the present invention, i.e., a dispersion obtained by wet grinding a 4-hydroxy-4'-isopropoxydiphenylsulfone developer into fine particles in the presence of a hydration inhibitor.

The heat-sensitive recording material of the present invention can be produced by coating at least one surface of a sheet-like substrate with a heat-sensitive recording layer coating composition, and drying the coating composition to form a heat-sensitive recording layer.

That is, the heat-sensitive recording material of the present invention comprises a sheet-like substrate and a heat-sensitive recording layer formed on at least one surface of the sheet-like substrate;

the heat-sensitive recording layer being formed by coating the sheet-like substrate with a heat-sensitive recording layer coating composition comprising a substantially colorless dye precursor and a developer, and drying the coating liquid; and the coating composition containing the 4-hydroxy-4'-isopropoxydiphenylsulfone developer dispersion of the present invention described above.

The heat-sensitive recording layer coating composition is prepared by mixing a dye precursor, developer and binder, together with optional auxiliaries such as sensitizers, preservability improving agents, pigments, etc.

Usable dye precursors include leuco dyes, which can be selected from triphenylmethane-based compounds, fluoran-based compounds, diphenylmethane-based compounds and other known leuco dyes.

Specifically, usable is at least one dye precursor selected from 3-(4-diethylamino-2-ethoxyphenyl)-3-(1-ethyl-2-methylindol-3-yl)-4-azaphthalide, crystal violet lactone, 3-(N-ethyl-N-isopentylamino)-6-methyl-7-anilinofluoran, 3-diethylamino-6-methyl-7-anilinofluoran, 3-diethylamino-6-methyl-7-(o,p-dimethylanilino)fluoran, 3-(N-ethyl-N-p-toluidino)-6-methyl-7-anilinofluoran, 3-pyrrolidino-6-methyl-7-anilinofluoran, 3-dibutylamino-6-methyl-7-anilinofluoran, 3-(N-cyclohexyl-N-methylamino)-6-methyl-7-anilinofluoran, 3-diethylamino-7-(o-chloroanilino)fluoran, 3-diethylamino-7-(m-trifluoromethylanilino)fluoran, 3-diethylamino-6-methyl-7-chlorofluoran, 3-diethylamino-6-methylfluoran, 3-cyclohexylamino-6-chlorofluorane, 3-(N-ethyl-N-hexylamino)-6-methyl-7-(p-chloroanilino)fluoran, 3-di(n-pentyl)amino-6-methyl-7-anilinofluoran, 3-(N-isoamyl-N-ethylamino)-7-(o-chloroanilino)fluoran, 3-(N-ethyl-N-2-tetrahydrofurfurylamino)-6-methyl-7-anilinofluoran, 3-diethylamino-6-chloro-7-anilinofluoran, 3-(N-n-hexyl-N-ethylamino)-6-methyl-7-anilinofluoran, 3-[N-(3-ethoxypropyl)-N-ethylamino]-6-methyl-7-anilinofluoran, 3-[N-(3-ethoxypropyl)-N-methylamino]-6-methyl-7-anilinofluoran, 3-diethylamino-7-(2-chloroanilino)fluoran, 3-(N-ethyl-p-toluidino)-6-methyl-7-(p-toluidino)fluoran, 3-piperidino-6-methyl-7-anilinofluoran, 3-diethylamino-7-(o-fluoroanilino)fluoran, 3-(4-dimethylamino)anilino-5,7-dimethylfluorane, etc.

The dye precursor content in the heat-sensitive recording layer is about 5 to about 50 mass %, and preferably about 8 to about 30 mass %.

Developers other than the developer dispersion of the present invention can be used in amounts that do not impair the effects of the present invention.

Examples of such other developers include 4,4'-isopropylidenediphenol, 4,4'-cyclohexylidenediphenol, 2,2-bis(4-hydroxyphenyl)-4-methylpentane, 2,4'-dihydroxydiphenylsulfone, 4,4'-dihydroxydiphenylsulfone, 3,3'-diallyl-4,4'-dihydroxydiphenylsulfone, 4-hydroxy-4'-methyldiphenylsulfone, 1,1-bis(4-hydroxyphenyl)-1-phenylethane, 1,4-bis[α-methyl-α-(4'-hydroxyphenyl)ethyl]benzene and like phenolic compounds; N-p-tolylsulfonyl-N'-phenylurea, 4,4'-bis[(4-methyl-3-phenoxycarbonylaminophenyl)ureido]diphenylme thane, N-p-tolylsulfonyl-N'-p-butoxyphenylurea and like compounds having sulfonyl group(s) and/or ureido group(s) in their molecules; zinc 4-[2-(p-methoxyphenoxy)ethyloxy]salicylate, zinc 4-[3-(p-tolylsulfonyl)propyloxy]salicylate, 5-[p-(2-p-methoxyphenoxyethoxy)cumyl]salicylic acid and like aromatic carboxylic acid zinc salt compounds; etc.

The developer content in the heat-sensitive recording layer is about 5 to about 60 mass %, and more preferably about 10 to about 50 mass %, calculated as the total content of the developer of the present invention and other developers that do not impair the effects of the present invention.

Examples of binders include polyvinyl alcohols of various molecular weights; starch and derivatives thereof; methoxycellulose, carboxymethylcellulose, methylcellulose, ethylcellulose and like cellulose derivatives; sodium polyacrylate, polyvinyl pyrrolidone, acrylic amide/acrylic ester copolymers, acrylic amide/acrylic ester/methacrylic acid terpolymers, alkali salts of styrene/maleic anhydride copolymers, polyacrylamides, sodium alginate, gelatin, casein and like water-soluble polymeric materials; and polyvinyl acetates, polyurethanes, styrene/butadiene copolymers, polyacrylic acids, polyacrylic esters, vinyl chloride/vinyl acetate copolymers, polybutyl methacrylate, ethylene/vinyl acetate copolymers, styrene/butadiene/acrylic copolymers and like hydrophobic polymer latices.

The binder content in the heat-sensitive recording layer is preferably about 5 to 40 mass %, and more preferably about 8 to about 30 mass %.

Heat-fusible substances (so-called sensitizers) can also be added to the heat-sensitive recording layer, in amounts that do not impair the effects of the present invention.

Examples of sensitizers include stearic acid amide, stearic acid methylene bisamide, stearic acid ethylene bisamide, 4-benzylbiphenyl, p-tolylbiphenyl ether, di(p-methoxyphenoxyethyl)ether, 1,2-di(3-methylphenoxy)ethane, 1,2-di(4-methylphenoxy)ethane, 1,2-di(4-methoxyphenoxy)ethane, 1,2-di(4-chlorophenoxy)ethane, 1,2-diphenoxyethane, 1-(4-methoxyphenoxy)-2-(3-methylphenoxy)ethane, 2-naphthyl benzyl ether, 1-(2-naphthyloxy)-2-phenoxyethane, 1,3-di(naphthyloxy)propane, dibenzyl oxalate, di-p-methylbenzyl oxalate, di-p-chlorobenzyl oxalate, dibutyl terephthalate, dibenzyl terephthalate, etc.

The sensitizer content in the heat-sensitive recording layer is preferably about 3 to about 40 mass %, and more preferably about 5 to about 30 mass %.

Preservability improving agents can also be added to increase the preservation stability of the recorded portion. Examples of such preservability improving agents include 2,2'-ethylidenebis(4,6-di-tert-butylphenol), 4,4'-thiobis(2-methyl-6-tert-butylphenol), 4,4'-butylidenebis(6-tert-butyl-3-methylphenol), 1,1,3-tris(2-methyl-4-hydroxy-5-tert-butylphenyl)butane, 1,1,3-tris(2-methyl-4-hydroxy-5-cyclohexylphenyl)butane, 2,2'-methylenebis(4-ethyl-6-tert-butylphenol), 2,2-bis(4-hydroxy-3,5-dimethylphenyl) propane, 2,4-di-tert-butyl-3-methylphenol, 1,3,5-tris(4-tert-butyl-3-hydroxy-2,6-dimethylbenzyl)isocyanuric acid and like hindered phenols; 4,4'-diglycidyloxydiphenylsulfone, 4-(2-methyl-1,2-epoxyethyl)diphenylsulfone, 4-(2-ethyl-1,2-epoxyethyl)diphenylsulfone, 4-benzyloxy-4'-(2,3-glycidyloxy)diphenylsulfone and like diphenylsulfone derivatives; and 2-(2'-hydroxy-5'-methylphenyl)benzotriazol, 2-hydroxy-4-benzyloxybenzophenone and like ultraviolet absorbers.

The preservability improving agent content in the heat-sensitive recording layer is about 1 to about 40 mass %, and preferably about 2 to about 30 mass %.

Examples of auxiliaries include waxes, organic and inorganic white pigments, etc. Known waxes are usable, including paraffins, amide waxes, bisimide waxes, metal salts of higher fatty acids, etc.

Examples of organic and inorganic white pigments include inorganic fine particles such as of calcium carbonate, silica, zinc oxide, titanium oxide, aluminium hydroxide, zinc hydroxide, barium sulfate, clay, calcined clay, talc, surface-treated calcium carbonate and silica, etc.; organic fine particles such as of urea-formaldehyde resins, styrene/methacrylic acid copolymers, polystyrene resins, etc.; and the like.

The wax content in the heat-sensitive recording layer is preferably about 1 to about 20 mass %, and more preferably about 3 to about 10 mass %. The white pigment content in the heat-sensitive recording layer is preferably about 5 to about 60 mass %, and more preferably about 10 to about 40 mass %.

The substrate for use in the heat-sensitive recording material of the present invention can be selected from paper; coated paper whose surface is coated with a pigment, latex and/or the like; multilayer synthetic paper made of polyolefin resin(s); plastic films; composite sheets of these; etc.

A coating composition containing a mixture of necessary components as described above is applied to at least one surface of such a sheet-like substrate, and dried to form a heat-sensitive recording layer, thereby producing a heat-sensitive recording material.

The amount of coating composition applied is, on a dry mass basis, preferably 1 to 15 $g/m^2$, and more preferably 2 to 10 $g/m^2$.

Undercoat Layer

An undercoat layer can be provided between the substrate and heat-sensitive recording layer, if necessary.

Such an undercoat layer can be formed by applying, to the substrate, an undercoat layer coating composition containing a pigment and binder, followed by drying.

Various pigments can be used, and typical examples include inorganic pigments such as calcined clay, and organic pigments.

Examples of binders include those usable for the heat-sensitive recording layer, among which starch, styrene-butadiene copolymers, etc. are especially preferable.

The amount of binder can be selected from a wide range, and it is generally preferable that the amount be about 5 to about 500 mass %, and more preferably about 10 to about 100 mass %, relative to the total pigment solids content.

The amount of the coating composition for such an undercoating layer is, on a dry mass basis, preferably about 1 to about 30 $g/m^2$, and more preferably about 5 to about 20 $g/m^2$.

In the heat-sensitive recording material of the present invention, a protective layer may be provided on the heat-sensitive recording layer to increase the oil resistance and plasticizer resistance of images.

Further, a smoothing treatment can be performed by super-calendering, after formation of each layer or after formation of all the layers.

Various other techniques known in the field of heat-sensitive recording material production can be additionally used as required.

The heat-sensitive recording material thus obtained is capable of forming excellent images, has high brightness and high sensitivity, and is unlikely to undergo grayish at high temperatures. Moreover, the recording material has low property of static sensitivity, and thus exhibits no abnormal color development at high temperatures.

EXAMPLES

The present invention is explained in detail below with reference to Examples and Comparative Examples; however, the present invention is not limited to these.

Herein, "parts" and "%" represent "parts by mass" and "% by mass", respectively, unless otherwise specified.

"Average particle diameter" means D50 measured by using a laser diffraction particle size distribution analyzer (product name: SALD-2000, product of Shimadzu Seisakusho Co.).

The purity of 4-hydroxy-4'-isopropoxydiphenylsulfone (product name: ALD-2000, product of Jiangsu Aolunda Hightech Industry Co., Ltd., Lot No. 050103) used in the Examples, Reference Examples and Comparative Examples below was measured by HPLC. As a result, the 4-hydroxy-4'-isopropoxydiphenylsulfone contained 0.017% of bis(4-hydroxyphenyl)sulfone and metal salts thereof, 0.03% of one or more compounds selected from diphenylsulfone derivatives represented by General Formula (1), and less than 0.002% of 4,4'-diisopropoxydiphenylsulfone.

Example I

<Dispersion>

Example I-1

Preparation of Dispersion BI-1

A composition containing 20 parts of 4-hydroxy-4'-isopropoxydiphenylsulfone (product name: ALD-2000, product of Jiangsu Aolunda Hightech Industry Co., Ltd., Lot No. 050103), 0.2 parts of 1,1,3-tris(2-methyl-4-hydroxy-5-cyclohexylphenyl)butane, 20 parts of 10% aqueous fully saponified polyvinyl alcohol (product name: PVA105, product of Kuraray Co., Ltd.) solution, and 70.8 parts of water was subjected to batch dispersion for 3 hours using a sand grinder by IMEX Corporation, giving a dispersion having an average particle diameter of 1 μm. No crystal growth was observed even when the thus-obtained dispersion was allowed to stand for 3 days.

Example I-2

Preparation of Dispersion BI-2

A dispersion having an average particle diameter of 1 μm was prepared in the same manner as in Example I-1 except that 1,1,3-tris(2-methyl-4-hydroxy-5-tert-butylphenyl)butane was used instead of 1,1,3-tris(2-methyl-4-hydroxy-5-cyclohexylphenyl)butane in the process of preparing dispersion BI-1 in Example I-1. No crystal growth was observed even when the thus-obtained dispersion was allowed to stand for 3 days.

Example I-3

Preparation of Dispersion BI-3

A dispersion having an average particle diameter of 1 μm was prepared in the same manner as in Example I-1 except that the amount of 1,1,3-tris(2-methyl-4-hydroxy-5-cyclohexylphenyl)butane was changed to 0.01 parts in the process of preparing dispersion BI-1 in Example I-1. No crystal growth was observed even when the thus-obtained dispersion was allowed to stand for 3 days.

Example I-4

Preparation of Dispersion BI-4

A dispersion having an average particle diameter of 1 μm was prepared in the same manner as in Example I-1 except that the amount of 1,1,3-tris(2-methyl-4-hydroxy-5-cyclohexylphenyl)butane was changed to 4.0 parts in the process of preparing dispersion BI-1 in Example I-1. No crystal growth was observed even when the thus-obtained dispersion was allowed to stand for 3 days.

Reference Example I-5

Preparation of Dispersion BI-5

A dispersion having an average particle diameter of 1 μm was prepared in the same manner as in Example I-1 except that the amount of 1,1,3-tris(2-methyl-4-hydroxy-5-cyclohexylphenyl)butane was changed to 6.0 parts and the amount of water was changed to 94 g in the process of preparing dispersion BI-1 in Example I-1. No crystal growth was observed even when the thus-obtained dispersion was allowed to stand for 3 days.

Comparative Example I-6

Preparation of Dispersion BI-6

A dispersion having an average particle diameter of 1 μm was prepared in the same manner as in Example I-1 except that the amount of 1,1,3-tris(2-methyl-4-hydroxy-5-cyclohexylphenyl)butane was changed to 0.002 parts in the process of preparing dispersion BI-1 in Example I-1. When the thus-obtained dispersion was allowed to stand for 3 days, slight crystal growth was observed and the average particle diameter became 1.2 μm.

Example I-7

Preparation of Dispersion BI-7

A dispersion having an average particle diameter of 0.8 μm was prepared in the same manner as in Example I-1 except that 4 parts of 5% aqueous hydroxypropyl methylcellulose (product name: Metrose 60SH03, product of Shinetsu Chemical Co., Ltd.) solution and 18 parts of 10% aqueous sulfone-modified polyvinyl alcohol (product name: GOHSERAN L-3266, product of the Nippon Synthetic Chemical Industry Co., Ltd.) solution were used instead of 20 parts of 10% aqueous fully saponified polyvinyl alcohol solution, and the amount of water was changed to 68.8 parts in the process of preparing dispersion BI-1 in Example I-1. No crystal growth was observed even when the thus-obtained dispersion was allowed to stand for 3 days.

Example I-8

Preparation of Dispersion BI-8

A dispersion having an average particle diameter of 1 μm was prepared in the same manner as in Example I-1 except that 4 parts of 5% aqueous methylcellulose (product name: Metrose SM-15, product of Shinetsu Chemical Co., Ltd.) solution and 18 parts of 10% aqueous fully saponified polyvinyl alcohol solution were used instead of 20 parts of 10% aqueous fully saponified polyvinyl alcohol solution, and the amount of water was changed to 68.8 parts in the process of preparing dispersion BI-1 in Example I-1. No crystal growth was observed even when the thus-obtained dispersion was allowed to stand for 3 days.

Example I-9

Preparation of Dispersion BI-9

A dispersion having an average particle diameter of 1 μm was prepared in the same manner as in Example I-1 except that 38 parts of 5% aqueous hydroxypropyl methylcellulose (product name: Metrose 60SH03, product of Shinetsu Chemical Co., Ltd.) solution and 1 part of 10% aqueous sulfone-modified polyvinyl alcohol (product name: GOHSERAN L-3266, product of the Nippon Synthetic Chemical Industry Co., Ltd.) solution were used instead of 20 parts of 10% aqueous fully saponified polyvinyl alcohol solution, the amount of water was changed to 51.8 parts, and the dispersion time was changed to 2 hours in the process of preparing dispersion BI-1 in Example I-1. No crystal growth was observed even when the thus-obtained dispersion was allowed to stand for 3 days.

Example III

A dispersion having an average particle diameter of 1 μm was prepared in the same manner as in Example I-1 except that 4-hydroxy-4'-isopropoxydiphenylsulfone (product name: ALD-2000, product of Jiangsu Aolunda Hightech Industry Co., Ltd., Lot No. 050103) was used after being purified in the process of preparing dispersion BI-1 in Example I-1.

The purity of 4-hydroxy-4'-isopropoxydiphenylsulfone after purification was measured by HPLC. As a result, the 4-hydroxy-4'-isopropoxydiphenylsulfone contained 0.006% of bis(4-hydroxyphenyl)sulfone and metal salts thereof, 0.008% of one or more compounds (B) selected from diphenylsulfone derivatives represented by General Formula (1), and less than 0.002% of 4,4'-diisopropoxydiphenylsulfone (C). No crystal growth was observed even when the thus-obtained dispersion was allowed to stand for 3 days.

<Heat-sensitive Recording Material>

Example I-10

Preparation of Heat-sensitive Recording Material

Preparation of Coating Composition for Undercoat Layer

To a dispersant obtained by dispersing 85 parts of calcined clay (product name: Ansilex, product of Engelhard Corporation) in 320 parts of water were mixed 40 parts of styrene-butadiene copolymer emulsion (solids content of 50%), and 50 parts of 10% aqueous oxidized starch solution, obtaining a coating composition for an undercoat layer.

Preparation of Dye Precursor Dispersion AI

A composition comprising 10 parts of 3-(N-ethyl-N-isopenthylamino)-6-methyl-7-anilinofluoranthene, 10 parts of 10% aqueous polyvinyl alcohol solution and 35 parts of water was subjected to dispersion using a sand grinder by IMEX Corporation, obtaining a dispersion having an average particle diameter of 0.8 μm.

Preparation of Sensitizer Dispersion CI

A composition comprising 20 parts of di-p-methylbenzyl oxalate, 20 parts of 10% aqueous polyvinyl alcohol solution and 70 parts of water was subjected to dispersion using a sand grinder by IMEX Corporation, obtaining a dispersion having an average particle diameter of 1 μm.

Preparation of Heat-sensitive Recording Layer Coating Composition

To 55 parts of the above-obtained AI solution, 111 parts of BI-1 solution and 110 parts of CI solution were mixed 24 parts of calcium carbonate, 12 parts of 30% zinc stearate dispersion, 10 parts of 30% paraffin dispersion and 100 parts of 10% aqueous polyvinyl alcohol solution followed by stirring, obtaining a heat-sensitive recording layer coating composition.

The BI-1 solution used had been allowed to stand for 3 days after preparation.

Preparation of Heat-sensitive Recording Material

The coating composition for undercoat layer was applied to one surface of 48 $g/m^2$ base paper in such a manner that the amount after drying was 7.0 $g/m^2$, followed by drying. The heat-sensitive recording layer coating composition was applied to the undercoat layer in such a manner that the amount after drying was 5.0 $g/m^2$, followed by drying. The thus-obtained heat-sensitive recording layer was then subjected to supercalendering, obtaining a heat-sensitive recording material having an Oken-type smoothness of 600-1000 seconds.

Reference Example I-11

Preparation of Heat-sensitive Recording Material

A heat-sensitive recording material was prepared in the same manner as Example I-10 except that the BI-1 solution used in preparing the heat-sensitive recording layer coating composition was changed to BI-5 solution (140 parts) and the amount of calcium carbonate used was changed to 18 parts. The BI-5 solution used had been allowed to stand for 3 days after preparation.

Example I-12

Preparation of Heat-sensitive Recording Material

A heat-sensitive recording material was prepared in the same manner as Example I-10 except that the BI-1 solution used in preparing the heat-sensitive recording layer coating composition was changed to BI-7 solution. The BI-7 solution used had been allowed to stand for 3 days after preparation.

Example I-13

Preparation of Heat-sensitive Recording Material

A heat-sensitive recording material was prepared in the same manner as Example I-10 except that the BI-1 solution used in preparing the heat-sensitive recording layer coating composition was changed to BI-9 solution. The BI-9 solution used had been allowed to stand for 3 days after preparation.

Comparative Example I

<Dispersion>

Comparative Example I-1

Preparation of Developer Dispersion BI-10

A dispersion having an average particle diameter of 1 μm was obtained in the same manner as in Example I-1 except that 1,1,3-tris(2-methyl-4-hydroxy-5-cyclohexylphenyl)butane was not used in the process of preparing the BI-1 solution in Example I-1. When the thus-obtained dispersion was allowed to stand for 3 days, crystal growth was observed and the average particle diameter became 3 μm.

<Heat-sensitive Recording Material>

Comparative Example I-2

Preparation of Heat-sensitive Recording Material

A heat-sensitive recording material was obtained in the same manner as in Example I-10 except that BI-10 solution was used instead of the developer dispersion BI-1 solution in preparing a heat-sensitive recording layer coating composition. The BI-10 solution used had been allowed to stand for 3 days after preparation.

Evaluation I

The thus-obtained heat-sensitive recording materials were subjected to the following evaluation tests. Table 1 shows the results.

[Brightness]

The brightness was measured according to JIS P-8148: 2001.

[Heat Resistance Brightness]

The heat-sensitive recording materials were heated at 60° C. for 1 hour, and the density was measured using a Macbeth densitometer in visual mode (product name: RD-914, product of Macbeth LLC).

[Properties of Static Sensitivity]

The heat-sensitive recording materials were heated at 70° C., under the pressure of $9.8\times10^4$ Pa for 5 seconds using a heat gradient imaging tester (product of Toyo-Seiki Co., Ltd.).

The density was measured using a Macbeth densitometer (product name: RD-914, Macbeth LLC) in visual mode.

[Sensitivity]

Each heat-sensitive recording material was subjected to color development at 0.24 mJ/dot using a heat-sensitivity evaluator (product name: TH-PMD, product of OKURA DENKI, and the density in the recorded portion was measured using a Macbeth densitometer (product name: RD-914, product of Macbeth LLC) in visual mode.

TABLE 1

| | Brightness | Heat resistance brightness | Properties of static sensitivity | Sensitivity |
|---|---|---|---|---|
| Example I-10 | 85.2 | 0.07 | 0.07 | 1.24 |
| Example I-11 | 85.6 | 0.07 | 0.07 | 1.10 |
| Example I-12 | 85.6 | 0.07 | 0.07 | 1.26 |
| Example I-13 | 85.6 | 0.07 | 0.07 | 1.24 |
| Comparative Example I-2 | 78.5 | 1.07 | 1.11 | 1.00 |

Example II

<Dispersion>

Example II-1

Preparation of Developer Dispersion BII-1

A composition comprising 20 parts of 4-hydroxy-4'-isopropoxydiphenylsulfone (product name: ALD-2000, product of Jiangsu Aolunda Hightech Industry Co., Ltd.), 0.2 parts of 1,3,5-tris(4-tert-butyl-3-hydroxy-2,6-dimethylbenzyl)isocyanuric acid, 18 parts of 10% aqueous sulfone-modified polyvinyl alcohol (product name: GOHSERAN L-3266, product of the Nippon Synthetic Chemical Industry Co., Ltd.) solution, 2 parts of 10% aqueous hydroxypropyl methylcellulose (product name: Metrose 60SH03, product of Shinetsu Chemical Co., Ltd.) solution, and 70.8 parts of water was subjected to dispersion using a sand grinder by IMEX Corporation, obtaining a dispersion having an average particle diameter of 1 μm. No crystal growth was observed even when the thus-obtained dispersion was allowed to stand for 3 days.

Example II-2

Preparation of Developer Dispersion BII-2

A dispersion having an average particle diameter of 1 μm was obtained in the same manner as in Example 1 except that 20 parts of 10% aqueous sulfone-modified polyvinyl alcohol (product name: GOHSERAN L-3266, product of the Nippon Synthetic Chemical Industry Co., Ltd.) solution was used instead of 18 parts of 10% aqueous sulfone-modified polyvinyl alcohol solution and 2 parts of 10% aqueous hydroxypropyl methylcellulose solution in the process of preparing a BII-1 solution in Example II-1. No crystal growth was observed even when the thus-obtained dispersion was allowed to stand for 3 days.

Example II-3

Preparations of Developer Dispersion BII-3

A dispersion having an average particle diameter of 1 μm was obtained in the same manner as in Example II-1 except that the amount of 1,3,5-tris(4-tert-butyl-3-hydroxy-2,6-dimethylbenzyl)isocyanuric acid used was changed to 0.01 parts in the process of preparing BII-1 in Example II-1. No crystal growth was observed even when the thus-obtained dispersion was allowed to stand for 3 days.

Example II-4

Preparation of Developer Dispersion BII-4

A dispersion having an average particle diameter of 1 μm was obtained in the same manner as in Example II-1 except that the amount of 1,3,5-tris(4-tert-butyl-3-hydroxy-2,6-dimethylbenzyl)isocyanuric acid used was changed to 4.0 parts in the process of preparing BII-1 in Example II-1. No crystal growth was observed even when the thus-obtained dispersion was allowed to stand for 3 days.

Reference Example II-5

Preparation of Developer Dispersion BII-5

A dispersion having an average particle diameter of 1 μm was obtained in the same manner as in Example II-1 except that the amount of 1,3,5-tris(4-tert-butyl-3-hydroxy-2,6-dimethylbenzyl)isocyanuric acid used was changed to 6.0 parts in the process of preparing BII-1 in Example II-1. No crystal growth was observed even when the thus-obtained dispersion was allowed to stand for 3 days.

Comparative Example II-6

Preparation of Developer Dispersion BII-6

A dispersion having an average particle diameter of 1 μm was obtained in the same manner as Example II-1 except that the amount of 1,3,5-tris(4-tert-butyl-3-hydroxy-2,6-dimethyl benzyl)isocyanuric acid used was changed to 0.002 parts in preparing BII-1 in Example II-1. When the thus-obtained dispersion was allowed to stand for 3 days, the average particle diameter became 1.2 μm, i.e., slight crystal growth was observed.

Example IV

A dispersion having an average particle diameter of 1 μm was prepared in the same manner as in preparing dispersion BII-1 of Example II-1, except that 4-hydroxy-4'-isopropoxydiphenylsulfone (product name: ALD-2000, product of Jiangsu Aolunda Hightech Industry Co., Ltd., Lot No. 050103) was used after being purified.

The purity of 4-hydroxy-4'-isopropoxydiphenylsulfone after purification was measured by HPLC. As a result, the 4-hydroxy-4'-isopropoxydiphenylsulfone contained 0.006% of bis(4-hydroxyphenyl)sulfone and metal salts thereof, 0.008% of one or more compounds selected from diphenylsulfone derivatives represented by General Formula (1), and less than 0.002% of 4,4'-diisopropoxydiphenylsulfone (C). No crystal growth was observed even when the thus-obtained dispersion was allowed to stand for 3 days.

<Heat-sensitive Recording Material>

Example II-7

Preparation of Heat-sensitive Recording Material

Preparation of Coating Composition for Undercoat Layer

To a dispersion obtained by dispersing 85 parts of calcined clay (product name: Ansilex, product of Engelhard Corporation) in 320 parts of water were mixed 40 parts of a styrene-butadiene copolymer emulsion (solids content of 50%) and 50 parts of 10% aqueous oxidized starch solution, obtaining a coating composition for undercoat layer.

Preparation of Dye Precursor Dispersion AII

A composition comprising 10 parts of 3-(N-ethyl-N-isopentylamino)-6-methyl-7-anilinofluoranthene, 10 parts of 10% aqueous polyvinyl alcohol solution and 35 parts of water was subjected to dispersion using a sand grinder by IMEX Corporation, obtaining a dispersion having an average particle diameter of 0.8 μm.

Preparation of Sensitizer Dispersion CII

A composition comprising 20 parts of di-p-methyl-benzyl oxalate, 20 parts of 10% aqueous polyvinyl alcohol solution and 70 parts of water was subjected to dispersion using a sand grinder by IMEX Corporation, obtaining a dispersion having an average particle diameter of 1 μm.

Preparation of Heat-sensitive Recording Layer Coating Composition

To 55 parts of the above-obtained AII solution, 111 parts of BII-1 solution and 110 parts of CII solution were mixed 24 parts of calcium carbonate, 12 parts of 30% zinc stearate dispersion, 10 parts of 30% paraffin dispersion and 100 parts of 10% aqueous polyvinyl alcohol solution followed by stirring, obtaining a heat-sensitive recording layer coating composition.

The BII-1 solution used had been allowed to stand for 3 days after preparation.

Preparation of Heat-sensitive Recording Material

The coating composition for undercoat layer was applied to one surface of 48 $g/m^2$ base paper in such a manner that the amount after drying was 7.0 $g/m^2$, followed by drying. The heat-sensitive recording layer coating composition was applied to the undercoat layer in such a manner that the amount after drying was 5.0 $g/m^2$, followed by drying. The thus-obtained heat-sensitive recording layer was then subjected to supercalendering, obtaining a heat-sensitive recording material having a smoothness of 600-1000 seconds.

Example II-8

Preparation of Heat-sensitive Recording Material

A heat-sensitive recording material was prepared in the same manner as Example II-7 except that the BII-1 solution used in preparing the heat-sensitive recording layer coating composition was changed to BII-2 solution. The BII-2 solution used had been allowed to stand for 3 days after preparation.

Reference Example II-9

Preparation of Heat-sensitive Recording Material

A heat-sensitive recording material was prepared in the same manner as Example II-7 except that the BII-1 solution used in preparing the heat-sensitive recording layer coating composition was changed to BII-5 solution. The BII-5 solution used had been allowed to stand for 3 days after preparation.

Comparative Example II

<Dispersion>

Comparative Example II-1

Preparation of Dispersion BII-7

A dispersion having an average particle diameter of 1 μm was obtained in the same manner as Example II-1 except that 1,3,5-tris(4-tert-butyl-3-hydroxy-2,6-dimethylbenzyl)isocyanuric acid was not used in the process of preparing the BII-1 solution. When the thus-obtained dispersion was allowed to stand for 3 days, crystal growth was observed and the average particle diameter became 3 μm.

<Heat-sensitive recording material>

Comparative Example II-2

Preparation of Heat-sensitive Recording Material

A heat-sensitive recording material was obtained in the same manner as Example II-7 except that the BII-7 solution was used instead of the developer dispersion BII-1 solution in preparing the heat-sensitive recording layer coating composition. The BII-7 solution used had been allowed to stand for 3 days after preparation.

Evaluation II

The thus-obtained heat-sensitive recording materials were subjected to the following evaluation tests. Table 2 shows the results.

[Brightness]

The brightness was measured according to JIS P-8148: 2001.

[Heat Resistance Brightness]

The heat-sensitive recording materials were heated at 60 ° C. for 1 hour, and the optical density of the unrecorded portion was measured using a Macbeth densitometer (product name: RD914, product of Macbeth LLC) in visual mode.

[Properties of Static Sensitivity]

The heat-sensitive recording materials were heated at 70° C. under the pressure of $9.8\times10^4$ Pa for 5 seconds using a heat gradient imaging tester (product of Toyo-Seiki Co., Ltd.). The density was measured using a Macbeth densitometer (product name: RD-914, Macbeth LLC) in visual mode.

[Sensitivity]

Each heat-sensitive recording material was subjected to color development at 0.24 mJ/dot using a heat-sensitivity evaluator (product name: TH-PMD, product of OKURA DENKI), the density in the recorded portion was measured using a Macbeth densitometer (product name: RD-914, product of Macbeth LLC) in visual mode.

TABLE 2

| | Brightness | Heat resistance brightness | Properties of static sensitivity | Sensitivity |
|---|---|---|---|---|
| Example II-7 | 85.6 | 0.07 | 0.07 | 1.24 |
| Example II-8 | 85.2 | 0.07 | 0.07 | 1.26 |
| Example II-9 | 85.6 | 0.07 | 0.07 | 1.10 |
| Comparative Example II-2 | 78.5 | 1.07 | 1.11 | 1.00 |

The invention claimed is:

1. A 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being:

(i-1) 1,1,3-tris(2-methyl-4-hydroxy-5-cyclohexylphenyl) butane, (i-2) 1,1,3-tris(2-methyl-4-hydroxy-5-cyclohexylphenyl) butane and 1,1,3-tris (2-methyl-4-hydroxy-5-tert-butylphenyl)butane, or (ii) 1,3,5-tris(4-tert-butyl-3-hydroxy-2,6-dimethylbenzyl) isocyanuric acid, the proportion of the hydration inhibitor being 0.02 to 25 parts by mass per 100 parts by mass of the developer.

2. A dispersion according to claim 1, wherein the hydration inhibitor 15:

(i-1) 1,1,3-tris(2-methyl-4-hydroxy-5-cyclohexylphenyl) butane, or (ii) 1,3,5-tris(4-tert-butyl-3-hydroxy-2,6-dimethylbenzyl) isocyanuric acid.

3. A dispersion according to claim 1, obtainable by wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

4. A dispersion according to claim 3, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

5. A dispersion according to claim 1, obtainable by wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

6. A dispersion according to claim 5, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

7. A dispersion according to claim 5, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer, and wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

8. A dispersion according to claim 1, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

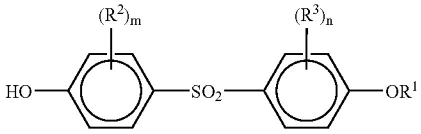

[Chemical Formula 5]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxydiphenylsulfone.

9. A 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being 1,1,3-tris(2-methyl-4-hydroxy-5-tert-butylphenyl)butane, wherein the proportion of the hydration inhibitor is 0.05 to 10 parts by mass per 100 parts by mass of the developer.

10. A dispersion according to claim 9, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

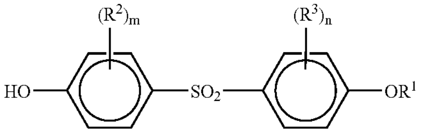

[Chemical Formula 5]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxy-diphenylsulfone.

11. A method for wet grinding a 4-hydroxy-4'-isopropoxy-diphenylsulfone developer, comprising the step of wet grinding a 4-hydroxy-4'-isopropoxydiphenylsulfone developer in the presence of a hydration inhibitor, the hydration inhibitor being:

(i-1) 1,1,3-tris(2-methyl-4-hydroxy-5-cyclohexylphenyl) butane, (i-2) 1,1,3-tris(2-methyl-4-hydroxy-5-cyclohexylphenyl) butane and 1,1,3-tris(2-methyl-4-hydroxy-5-tert-butylphenyl)butane, or (ii) 1,3,5-tris(4-tert-butyl-3-hydroxy-2,6-dimethylbenzyl) isocyanuric acid, the proportion of the hydration inhibitor being 0.02 to 25 parts by mass per 100 parts by mass of the developer.

12. A method according to claim 11, wherein the hydration inhibitor is:

(i-1) 1,1,3-tris(2-methyl-4-hydroxy-5-cyclohexylphenyl) butane, or (ii) 1,3,5-tris(4-tert-butyl-3-hydroxy-2,6-dimethylbenzyl) isocyanuric acid.

13. A method according to claim 11, comprising the step of wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

14. A method according to claim 13, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

15. A method according to claim 11, comprising the step of wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

16. A method according to claim 15, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

17. A method according to claim 15, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer, and wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

18. A method according to claim 11, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

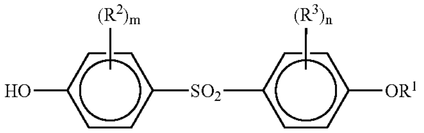

[Chemical Formula 6]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxy-diphenylsulfone.

19. A method for wet grinding a 4-hydroxy-4'-isopropoxy-diphenylsulfone developer, comprising the step of wet grinding a 4-hydroxy-4'-isopropoxydiphenylsulfone developer in the presence of a hydration inhibitor, the hydration inhibitor being 1,1,3-tris(2-methyl-4-hydroxy-5-tert-butylphenyl)butane, wherein the proportion of the hydration inhibitor is 0.05 to 10 parts by mass per 100 parts by mass of the developer.

20. A method according to claim 19, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

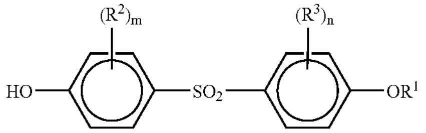

[Chemical Formula 6]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxy-diphenylsulfone.

21. A heat-sensitive recording material comprising a sheet-form support and a heat-sensitive recording layer formed on at least one surface of the sheet-form support, the heat-sensitive recording layer being formed by coating the sheet-form support with a heat-sensitive recording layer coating composition comprising a substantially colorless dye precursor and a developer, and then drying the coating, the heat-sensitive recording layer coating composition containing a 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being:

(i-1) 1,1,3-tris(2-methyl-4-hydroxy-5-cyclohexylphenyl) butane, (i-2) 1,1,3-tris(2-methyl-4-hydroxy-5-cyclohexylphenyl) butane and 1,1,3-tris(2-methyl-4-hydroxy-5-tert-butylphenyl)butane, or (ii) 1,3,5-tris(4-tert-butyl-3-hydroxy-2,6-dimethylbenzyl) isocyanuric acid, the proportion of the hydration inhibitor being 0.02 to 25 parts by mass per 100 parts by mass of the developer.

22. A heat-sensitive recording material according to claim 21, wherein the hydration inhibitor is:

(i-1) 1,1,3-tris(2-methyl-4-hydroxy-5-cyclohexylphenyl) butane, or (ii) 1,3,5-tris(4-tert-butyl-3-hydroxy-2,6-dimethylbenzyl) isocyanuric acid.

23. A heat-sensitive recording material according to claim 21, wherein the 4-hydroxy-4'-isopropoxydiphenylsulfone developer dispersion is obtainable by wet grinding a 4-hydroxy-4'-isopropoxydiphenylsulfone developer in the presence of:

(A) the hydration inhibitor, and (B) at least one dispersing binder selected from the group consisting of hydroxypropyl methylcellulose, hydroxyethyl methylcellulose, hydroxyethylcellulose and methylcellulose.

24. A heat-sensitive recording material according to claim 23, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer.

25. A heat-sensitive recording material according to claim 21, wherein the 4-hydroxy-4'-isopropoxydiphenylsulfone developer dispersion is obtainable by wet grinding a 4-hydroxy-4'-isopropoxydiphenylsulfone developer in the presence of:

(A) the hydration inhibitor, (B) at least one member selected from the group consisting of hydroxypropyl methylcellulose, hydroxyethyl methylcellulose, hydroxyethylcellulose and methylcellulose, and (C) a sulfone-modified polyvinyl alcohol.

26. A heat-sensitive recording material according to claim 25, wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

27. A heat-sensitive recording material according to claim 25, wherein the proportion of said at least one member selected from the group consisting of hydroxypropyl methylcellulose, hydroxyethyl methylcellulose, hydroxyethylcellulose and methylcellulose is 0.2 to 15 parts by mass per 100 parts by mass of the 4-hydroxy-4'-isopropoxydiphenylsulfone developer, and wherein the proportion of said at least one member selected from the group consisting of hydroxypropyl methylcellulose, hydroxyethyl methylcellulose, hydroxyethylcellulose and methylcellulose is 2 to 2000 parts by mass per 100 parts by mass of the sulfone-modified polyvinyl alcohol.

28. A heat-sensitive recording material according to claim 21, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

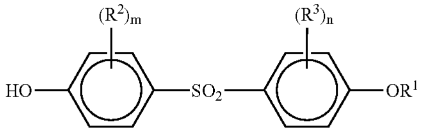

[Chemical Formula 7]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxy-diphenylsulfone.

29. A heat-sensitive recording material comprising a sheet-form support and a heat-sensitive recording layer formed on at least one surface of the sheet-form support, the heat-sensitive recording layer being formed by coating the sheet-form support with a heat-sensitive recording layer coating composition comprising a substantially colorless dye precursor and a developer, and then drying the coating, the heat-sensitive recording layer coating composition comprising a 4-hydroxy-4'-isopropoxydiphenylsulfone developer dispersion obtainable by wet grinding a 4-hydroxy-4'-isopropoxydiphenylsulfone developer in the presence of a hydration inhibitor, the hydration inhibitor being: 1,1,3-tris(2-methyl-4-hydroxy-5-tert-butylphenyl)butane, the proportion of the hydration inhibitor being 0.05 to 10 parts by mass per 100 parts by mass of the developer.

30. A heat-sensitive recording material according to claim 29, wherein the 4-hydroxy-4'-isopropoxydiphenylsulfone developer is of high purity, the developer comprising, per 100 parts by mass of 4-hydroxy-4'-isopropoxydiphenylsulfone:

no more than 0.02 parts by mass of compound(s) selected from bis(4-hydroxyphenyl)sulfone and metallic salts thereof, no more than 0.05 parts by mass of one or more compounds selected from diphenylsulfone derivatives represented by the following general formula (1):

(1)

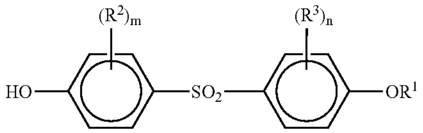

[Chemical Formula 7]

(wherein $R^1$ represents a hydrogen atom or isopropyl group, $R^2$ and $R^3$ each independently represent an isopropyl group, and n and m each independently represent 0, 1 or 2, with the proviso that n and m are not both 0), and no more than 0.01 parts by mass of 4,4'-diisopropoxydiphenylsulfone.

* * * * *